United States Patent [19]

Manabe et al.

[11] Patent Number: 4,496,603

[45] Date of Patent: Jan. 29, 1985

[54] PROCESS FOR PRODUCING PECTIN JELLY

[75] Inventors: Masatoshi Manabe, Kagawa; Toshio Miyake, Okayama, both of Japan

[73] Assignee: Kabushiki Kaisha Hayashibara Seibutsu Kagaku Kenkyujo, Okayama, Japan

[21] Appl. No.: 501,068

[22] Filed: May 31, 1983

[30] Foreign Application Priority Data

Jul. 24, 1982 [JP] Japan ................. 57-129482

[51] Int. Cl.$^3$ .......................... A23L 1/06; A23C 9/154
[52] U.S. Cl. ................................ 426/577; 426/658; 426/583; 426/639
[58] Field of Search ............... 426/577, 548, 658, 583, 426/639

[56] References Cited

U.S. PATENT DOCUMENTS

| 2,876,101 | 3/1959 | Bliudzius et al. | 426/577 |
| 2,910,365 | 10/1959 | Histon | 426/577 |
| 3,065,081 | 11/1962 | Leo | 426/577 |
| 3,595,676 | 7/1971 | Langen et al. | 426/577 |
| 3,728,132 | 4/1973 | Tsuyama | 426/548 |
| 3,892,871 | 7/1975 | Cooper | 426/577 |
| 4,136,209 | 1/1979 | Fox | 426/577 |
| 4,200,694 | 4/1980 | Ishii et al. | 426/577 |

*Primary Examiner*—Jeanette Hunter
*Attorney, Agent, or Firm*—Browdy and Neimark

[57] ABSTRACT

Disclosed is an invention providing a process for producing pectin jelly. More particularly, the invention provides a process to produce pectin jelly containing glycosylsucrose, comprising: (1) providing an aqueous mixture containing at least HMP, glycosylsucrose and organic acid, and gelatinizing the mixture at a pH in the range of 3.3–3.5; or, alternatively, (2) providing an aqueous mixture containing at least LMP, glycosylsucrose, multivalent metal ion and organic acid, and gelatinizing the mixture at a pH in the range of 3.6–4.0, and whereby a pectin jelly having a satisfiable gel strength and excellent in texture and flavor is easily obtained while the glycosylsucrose constituent is kept stable.

9 Claims, 7 Drawing Figures

4,496,603

PROCESS FOR PRODUCING PECTIN JELLY

FIELD OF THE INVENTION

The present invention relates to a process for producing food products, particularly, it relates to a process for producing a pectin jelly wherein glycosylsucrose is used.

BACKGROUND OF THE INVENTION

As disclosed in U.S. Pat. No. 3,728,132 (Sugimoto et al.), glycosylsucrose or sucrose-coupled starch syrup is a sweetener, obtained by subjecting a mixture solution of a liquefied starch and sucrose to the enzymatic action of a bacterial cyclodextrin glycosyltransferase (EC 2.4.1.19) to transfer some glucose moieties from the liquefied starch to the glucose residue of the sucrose molecule in α-1,4-fashion. Glycosylsucrose is available in large quantity as "Coupling Sugar", Registered Trade Mark of Hayashibara Co., Ltd., Okayama, Japan.

One advantage of glycosylsucrose is the feasibility as a low-cariogenic sweetener because it does not form cariogenic water-insoluble glucan and forms substantially no organic acid.

In order to make the most of the low-cariogenicity, it is necessary to avoid the breakdown of glycosylsucrose in the production and storage of processed food products wherein glycosylsucrose is used.

Since pectin jelly is suitable for mass production because of the fact that it is, unlike agar jelly, storable under freezing conditions, its production has been steadily increased.

It is, however, very difficult to produce a pectin jelly having a satisfactory gel strength while stably maintaining glycosylsucrose because the production steps of pectin jelly involves acidic, high-temperture and pressure conditions which are severe on glycosylsucrose.

*Kagaku to Seibutsu*, Vol.7, No.3, pp. 142-143 (1969), reports that the mechanism of gel formation with high methoxyl pectin, a pectin with a methoxyl content exceeding 7%, is entirely different from that with low methoxyl pectin, a pectin having a methoxyl content of below 7%. "High- and low methoxyl pectins" are abbreviated hereinafter as "HMP" and "LMP" respectively. According to the article, pectin jelly with HMP is a hydrogen-bonded type gel by HMP-saccharide-acid-water system, and the optimum pH for gel formation is in the range of 2.8-3.2; and, in contrast, pectin jelly with LMP is an ionically-bonded type gel by LMP-multivalent metal ion-water system, and the presence of saccharide or acid is not necessarily required. Also is reported that the use of saccharide and/or acid is necessary to improve the flavor of pectin jelly, which complicates the mechanism of gel formation with LMP.

Additionally, *Journal of Japanese Society of Nutrition and Food Science*, Vol. 28, No. 1, pp. 17-24 (1975), reports that LMP has a relatively wide setting pH range, and that the gel formation occurs at a pH in the range of 2.5-6.5.

Thus, there existed strong needs for a process to produce a glycosylsucrose-containing pectin jelly having a satisfactory gel strength while avoiding the breakdown of the glycosylsucrose constituent. It will be apparent from the followings that the present invention does satisfy these needs.

SUMMARY OF THE INVENTION

One object of the present invention is to provide a practical process to produce a pectin jelly wherein glycosylsucrose is used.

Another object of the present invention is to provide a process to produce a glycosylsucrose-containing pectin jelly having a satisfactory gel strength.

A further object of the present invention is to provide a process to produce a glycosylsucrose-containing pectin jelly wherein the glycosylsucrose constituent is kept stable.

An additional object of the present invention is to provide a process to produce a pectin jelly which is excellent in flavor and texture.

These and other objects which will become apparent hereinafter are attained by the process comprising: (1) providing an aqueous mixture containing at least HMP, glycosylsucrose and organic acid, and gelatinizing the mixture at a pH in the range of 3.3-3.5; or, alternatively, (2) providing an aqueous mixture containing at least LMP, glycosylsucrose, multivalent metal ion and organic acid, and gelatinizing the mixture at a pH in the range of 3.6-4.0.

BRIEF DESCRIPTION OF THE FIGURES

In FIGS. 1 and 2, pectin concentration is 0.5% (-----); 0.75%, (—); and 1.0%, (-----);

In FIGS. 3 through 6, glycosylsucrose is used as the saccharide (o); and sucrose, (•);

DETAILED DESCRIPTION OF THE INVENTION

Figure 2:
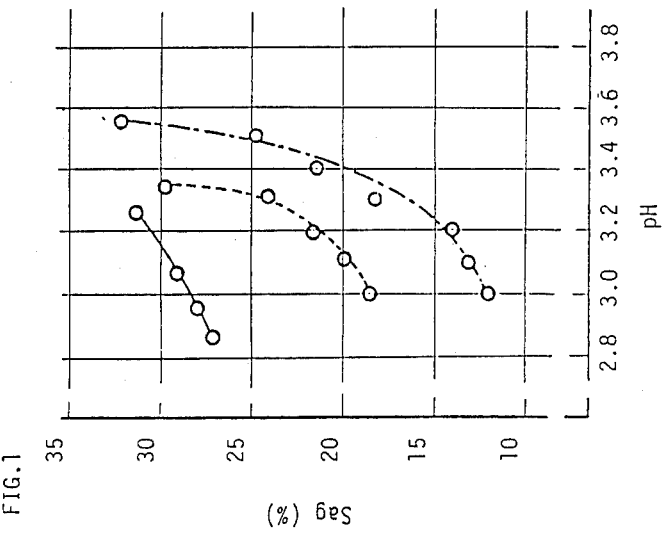
FIG. 2 shows the effects of pH and pectin concentration on the gel strength of the glycosylsucrose-containing HMP (slow-set pectin) jelly.

The present invention is based on the finding that, in the production of a glycosylsucrose-containing pectin jelly, gelatinization of HMP or LMP in a pH range of 3.3-3.5 or 3.6-4.0 yields a pectin jelly having a satisfactory gel strength while keeping the glycosylsucrose constituent stable.

"Pectin jelly", produced according to the invention, refers to those which exhibit a satisfactory gel strength, and wherein the glycosylsucrose constituent is substantially unsusceptible to hydrolysis.

In the process according to the invention, HMP, saccharide and organic acid are prepared into an aqueous mixture having final concentrations of 0.7-2.0% for HMP and 50-75% for saccharide, pH in the range of 3.3-3.5; boiling the mixture; and cooling the resultant mixture to effect gelatinization. Alternatively, LMP, saccharide, multivalent metal ion and organic acid are prepared into an aqueous mixture having final concentrations of 0.7–2.0% for LMP and 10–50% for saccharide and 20–50 mg/g LMP for multivalent metal ion, pH in the range of 3.6–4.0; boiling the mixture; and cooling the resultant mixture to effect gelatinization.

The percentages are given on the basis of dry solids unless specified otherwise.

The HMP and LMP usable in the invention include those originating from flesh, juice and pulp of fruit, and are not be limited to commercial HMP and LMP preparations.

As to the saccharide which is to be incorporated into the pectin jelly, although the pectin jelly can be prepared by the sole use of glycosylsucrose, other sweeteners, e.g. sucrose, maltose, corn syrup, maltitol or α-glycosyl stevioside, may be used in combination with glycosylsucrose, provided that the incorporation of such sweetener(s) does not render the pectin jelly unstable and prevent the obtainment of a satisfactory gel strength. If glycosylsucrose is combined with one or more other sweeteners, it is desirable to incorporate glycosylsucrose in a ratio of more than 50% against the sweetener(s) in order to fully exhibit the advantages of glycosylsucrose. In the boiling step, the contact of glycosylsucrose with the acid at an elevated temperature should be shortened as much as possible because glycosylsucrose is relatively unstable under such boiling conditions.

As to the organic acid usable in the invention, citric acid, tartaric acid, malic acid, lactic acid or phosphoric acid is suitable. A natural fruit juice, e.g., those from lemon or grape, may be used in place of the organic acid.

As to the multivalent metal ion, a variety of salt sources containing $Ca^{2+}$, $Mg^{2+}$ or others are usable. A milk may be, if necessary, used when it contains such a metal ion.

A fruit jelly may be obtained by incorporating a whole fruit, fruit fragment or pulp, such as those of melon, lemon, cherry, peach, chestnut, prune, strawberry, or kiwi fruit during the production steps according to the invention. By replacing such whole fruit, fruit fragment or pulp with those of vegetable or seaweed, such as tomato, cucumber, pumpkin, carrot, burdock, Japanese radish, cabbage, spinach, or HIJIKI - a kind of brown algae, wakame seaweed or tangle, a variety of jelly products may be prepared. Also, AN, obtained by grinding beans, admixing with sucrose, and boiling up the resultant mixture, may be added in the pectin jelly to prepare an "AN jelly". Especially, the LMP jelly obtained according to the invention may be used as a material for preparing Bavarian cream, pudding, yogurt and others, as well as for preparing jelly confectioneries in general.

The pectin jelly can be prepared into various shapes, e.g. a cone, disk, square pillar, stick, cube, or sheet, as may be desired.

The pectin jelly containing glycosylsucrose thus obtained is excellent in freeze resistance, gloss and flavor without fear of effecting syneresis.

The following experiments further explain the present invention.

EXPERIMENT

1. Materials

In this experiment, "Rapid Set Pectin No. 3436" and "Slow Set Pectin No. 3451", products of Sunkist Growers, Inc., Ontario, Calif., U.S.A., were used as HMP. LMP was "Genu Pectin LM 102 AS", a product of Copenhagen Pectin Inc., Copenhagen, Denmark. The three pectin preparations were washed with 60% ethanol and freed of glucose, prior to use. The glycosylsucrose was "Coupling Sugar", a commercial glycosylsucrose syrup having a moisture content of 25%, Registered Trade Mark of Hayashibara Co., Ltd., Okayama, Japan. A commercial refined sugar was used as sucrose. Tartaric acid, citric acid, sodium citrate and calcium chloride were first-grade reagents of Nakarai Kagaku Yakuhin KK, Kyoto, Japan.

2. HMP jelly

Figure 1:
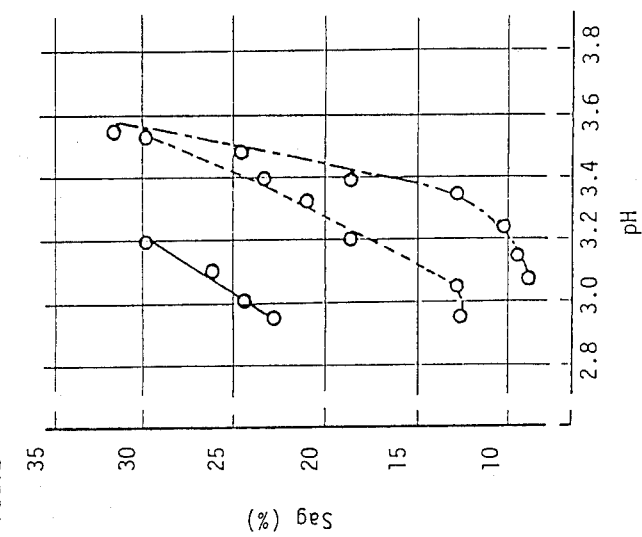
FIG. 1 shows the effects of pH and pectin concentration on the gel strength of the glycosylsucrose-containing HMP (rapid-set pectin) jelly.

An HMP jelly was prepared according to the "Acid in Glass Method" described in *Nosan Kako Gijutsu Kenkyu Kaishi*, Vol. 4, No. 6, pp. 234–239 (1957) with slight modification: A mixture of HMP (rapid- or slow-set pectin) and glycosylsucrose was admixed with water. The mixture was boiled to the given concentration while stirring, and cooled to 95° C. The mixture was distributed into several jelly glasses wherein tartaric acid aliquots had been placed to bring the pH to the given level. After 15-minute standing, the jelly glasses were covered and transferred into a 25±3° C. incubator, followed by 20-minute incubation. Thereafter, the sagging degree of the contents were determined with an "Exchange Ridgelimeter", a product of Sunkist Growers, Inc., Ontario, Calif., U.S.A.: The lower the sag (%), the higher the gel strength is. The results for the two types of HMP (rapid- or slow-set pectin) are given in FIGS. 1 and 2 respectively. It is well known that a gel strength appropriate for HMP jelly is about 23.5 in terms of the sag (%). As is evident from FIGS. 1 and 2, a satisfactory gel strength in a glycosylsucrose-containing pectin jelly is obtained at a pH in the range of ca. 3.2–3.5, somewhat dependent upon the type of HMP and concentration thereof.

3. LMP jelly

The prescribed amount of water was added with 10 ml of 6% sodium citrate solution in an enameled pot. The mixture was further admixed with citric acid solution to obtain the given pH level. To the mixture was added 1 part of LMP and 5 parts of saccharide, and the resultant mixture was heated to boiling. Then, the remaining part of the saccharide was added thereto, and the mixture was further boiled while stirring. Thereafter, the mixture was admixed with the prescribed amount of a prewarmed calcium chloride solution, and the subsequent operations were all carried out similarly as in the case of the HMP jelly. In this experiment, glycosylsucrose and sucrose were used for comparison. The results are given in FIGS. 3 through 6.

Figure 3:
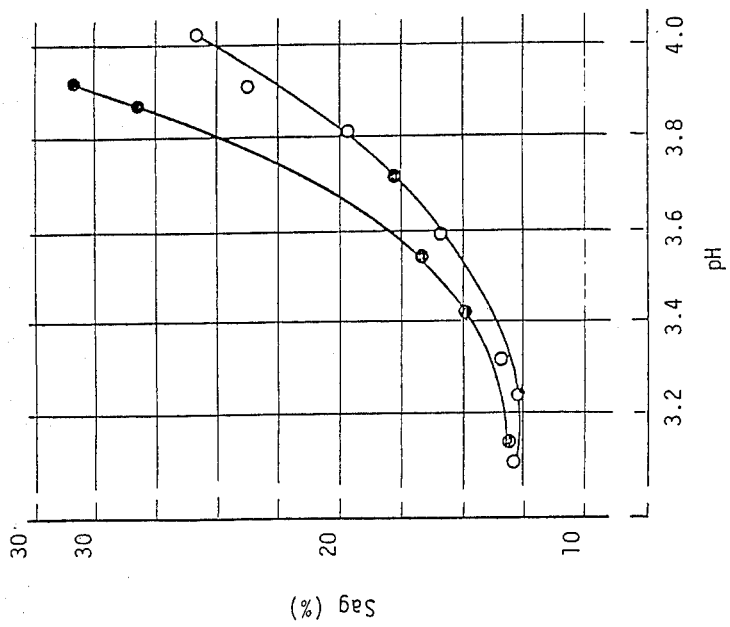
FIG. 3 shows the effects of saccharide and pH on the gel strength of LMP jelly.

FIG. 3 shows the effects of pH and saccharide on LMP jelly. It is well known that the gel strength appropriate for LMP jelly is about 20–21 in terms of the sag (%). As shown in FIG. 3, the pH whereby the satisfactory gel strength is formed is about 3.8 with glycosylsucrose, and slightly lower with sucrose, about 3.6. This is very advantageous for maintaining the stability of glycosylsucrose in the pectin jelly.

Figure 4:
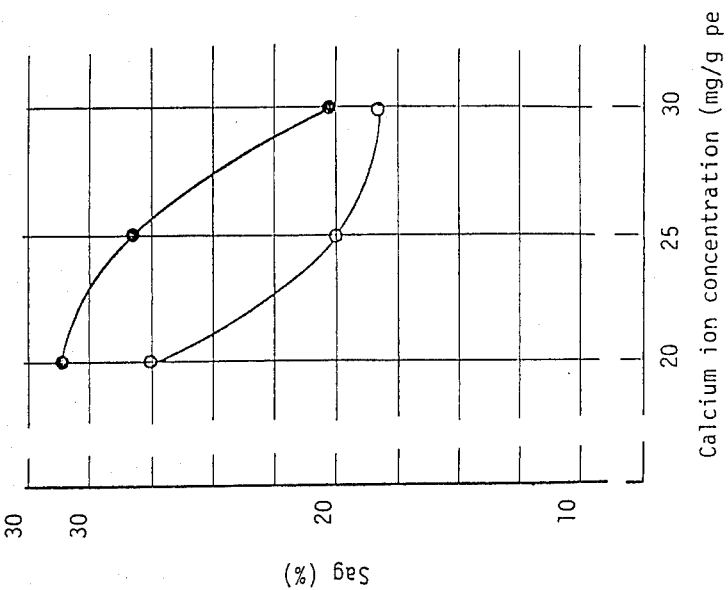
FIG. 4 shows the effects of saccharide and $Ca^{2+}$ concentration on the gel strength of LMP jelly.

FIG. 4 shows the effects of saccharide and $Ca^{2+}$ concentration on the gel strength of LMP jelly. As is evident from FIG. 4, an LMP jelly having a satisfactory gel strength is formed with glycosylsucrose at a lower $Ca^{2+}$ concentration, in comparison with the case of using sucrose.

Figure 5:
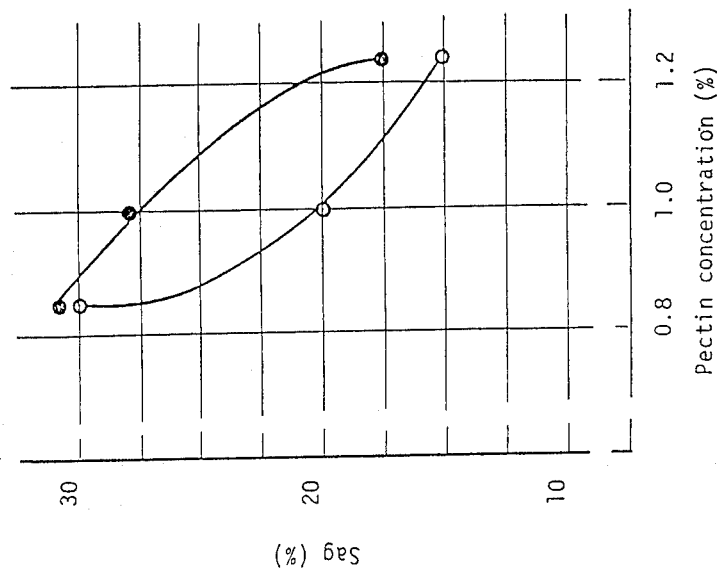
FIG. 5 shows the effects of saccharide and pectin concentration on the gel strength of LMP jelly.

FIG. 5 shows the effects of saccharide and pectin concentration on the gel strength of LMP jelly. As is obvious from FIG. 2, an LMP jelly having a satisfactory gel strength is formed with glycosylsucrose at a lower LMP concentration, in comparison with the case of using sucrose.

Figure 6:
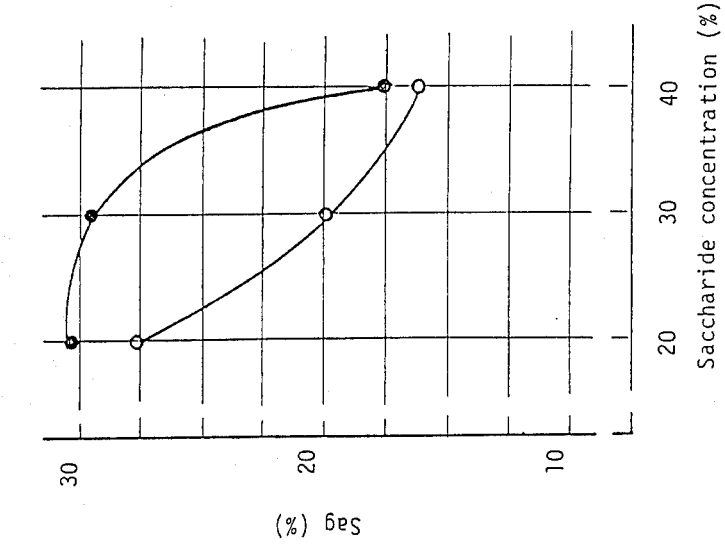
FIG. 6 shows the effects of saccharide and concentration thereof on the gel strength of LMP jelly.

FIG. 6 shows the effects of saccharide and the concentration thereof on the gel strength of LMP jelly. FIG. 6 shows that the pH whereby an LMP jelly having a satisfactory gel strength is formed is lower with glycosylsucrose than with sucrose.

From the foregoing experimental results in FIGS. 4 through 6, it is obvious that the gel formation of LMP jelly with glycosylsucrose is much easier than with sucrose.

4. Stability of glycosylsucrose in pectin jelly

HMP- and LMP jellies were prepared in accordance with the foregoing procedures: In the HMP jelly, the glycosylsucrose content was 65%; HMP content (rapid-set pectin), 0.75%; and pH, 2.8–3.3. In the LMP jelly, the glycosylsucrose content was 30%; LMP content, 1.0%; calcium ion, 25 mg/g LMP; and pH, 3.3–4.0.

Figure 7:
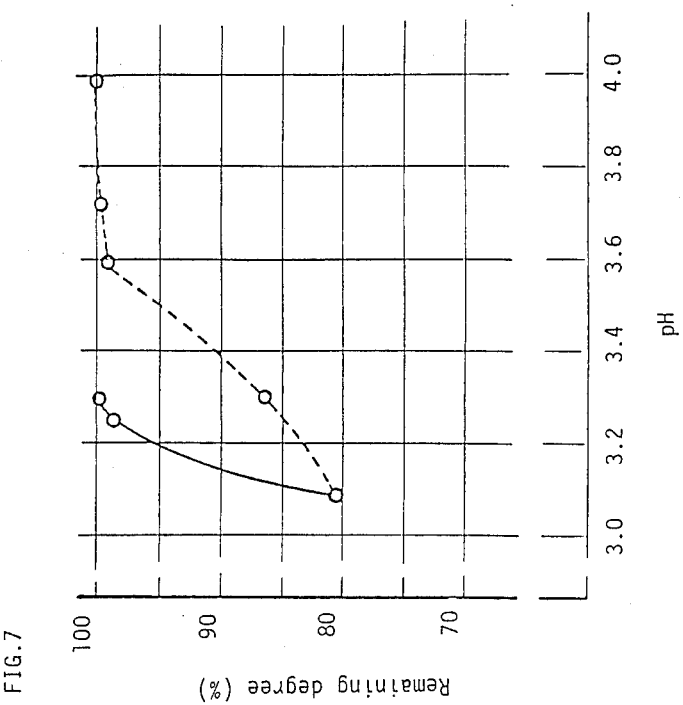
FIG. 7 shows the relationship between the remaining degree of glycosylsucrose vs. pH in HMP- and LMP jellies.

Both pectin jellies were stored at 5° C. for one month, and the remaining glycosylsucrose was determined according to the gas-chromatographic procedure described in "Directions for Analyzing Nutrient Components in Japan Special-labeling Diet Foods", edited by Japan Dietetic and Enriched Foods Association, pp. 73–79 (1982). The results are given in FIG. 7. As is evident from FIG. 7, the remaining degree of glycosylsucrose tends to decrease as pH declines, while the glycosylsucrose constituent in the HMP- or LMP jelly is stable without effecting substantial hydrolysis at a pH above 3.3 or above 3.6 respectively.

With reference to FIGS. 1, 2 and 7, or FIGS. 3 and 7, one may easily recognize that the main objects of the present invention of obtaining a glycosylsucrose-containing pectin jelly with a satisfactory gel strength and stably maintaining the glycosylsucrose therein are attained by gelatinizing HMP or LMP at a pH in the range of 3.3–3.5 or 3.6–4.0, respectively in the production of a pectin jelly wherein glycosylsucrose is used.

Several embodiments of the present invention are illustrated hereinafter.

EXAMPLE 1

Lemon Jelly

One liter of water was heated up to 70° C. admixed and added with a mixture of 100 g of HMP (rapid-set pectin) and 1 kg of a commercial glycosylsucrose powder, Coupling Sugar ®, followed by heating to boiling. Then, the resultant mixture was admixed with 9 kg of Coupling Sugar ® and heated to 104° C. After cooling to 95° C., the mixture was further admixed with appropriate amounts of lemon flavor and coloring agent. The resultant mixture was admixed with a citric acid solution, prewarmed to 60° C., to bring the pH level to 3.3, distributed, cooled and packed to obtain the titled product.

The product is a lemon jelly excellent in flavor and texture, and the glycosylsucrose constituent is stable therein.

EXAMPLE 2

Melon jelly

Five liters of water was heated up to 80° C., and admixed with a mixture of 300 g of HMP (slow-set pectin), 25 g of sodium citrate and 10 kg of a commercial maltose powder, Sunmalt ®, a product of Hayashibara, Co., Ltd., Okayama, Japan. After heating to boiling, the admixture was admixed with 15 kg of a commercial glycosylsucrose syrup, Coupling Sugar ®, and heated to 103° C. After cooling to 95° C., the admixture was further admixed with appropriate amounts of melon flavor and coloring agent. The resultant mixture was admixed with a citric acid solution, prewarmed to 70° C., to bring the pH level to 3.4, distributed, cooled, and packed to obtain the titled product.

The product is a melon jelly excellent in flavor and texture, and the glycosylsucrose constituent is stable therein.

EXAMPLE 3

Yogurt jelly

A solution, prepared by dissolving 380 ml of yogurt and 100 g of a whole milk powder in 1.6 liters of water by heating and stirring, was admixed with 25 g of LMP, 250 g of a commercial glycosylsucrose powder, Coupling Sugar ®, and 50 g of a commercial maltitol powder, Mabit ®, products of Hayashibara Co., Ltd., Okayama, Japan. The mixture was then admixed with an appropriate amount of vanilla essence and a lactic acid solution to bring the pH level to 3.8. The resultant mixture was distributed, cooled and packed to obtain the titled product.

The product is a yogurt jelly excellent in flavor and texture, and the glycosylsucrose constituent is stable therein.

EXAMPLE 4

Pineapple jelly

A mixture of 2 kg of a commercial glycosylsucrose syrup, Coupling Sugar ®, 1 kg of sucrose and 100 g of LMP was dissolved in 8 liters of water, prewarmed to 80° C., to obtain a solution which was then admixed with appropriate amounts of pineapple flavor and coloring agent and 50% citric acid solution to bring the pH to 3.9. The resultant mixture was admixed with 100 ml of an aqueous solution, containing 11 g of calcium chloride dihydrate, to homogeneity, distributed, cooled and packed to obtain the titled product.

The product is a pineapple jelly excellent in flavor and texture, and the glycosylsucrose constituent is stable therein.

From the foregoing description, it will be apparent that the present invention provides a practical process to produce a glycosylsucrose-containing pectin jelly having a satisfactory gel strength.

It will be understood by those skilled in the art that various modifications of the present invention with reference to the foregoing EXAMPLES may be employed without departing from the scope of the invention.

What is claimed is:

1. A process for producing a glycosylsucrose-containing pectin jelly, comprising:
    providing an aqueous mixture containing at least high-methoxyl pectin, glycosylsucrose and organic acid; and
    gelatinizing the mixture at a pH in the range of 3.3–3.5,
    wherein the final concentration of said high-methoxyl pectin is in the range of 0.7–2.0% and the final concentration of said glycosylsucrose is in the range of 50–75%.

2. A process in accordance with claim 1, wherein said organic acid is one or more members selected from the group consisting of citric acid, tartaric acid, malic acid, lactic acid and phosphoric acid.

3. A process in accordance with claim 1, wherein a member selected from the group consisting of sucrose, maltose, corn syrup, maltitol, α-glycosyl stevioside and mixtures thereof is used in combination with said glycosylsucrose.

4. A glycosylsucrose-containing pectin jelly prepared by the process of claim 1.

5. A process for producing a glycosylsucrose-containing pectin jelly, comprising:
providing an aqueous mixture containing at least low-methoxyl pectin, glycosylsucrose, multivalent metal ion and organic acid; and
gelatinizing the mixture at a pH in the range of 3.6–4.0,
wherein the final concentration of said low-methoxyl pectin is in the range of 0.7–2.0%, the final concentration of said glycosylsucrose is in the range of 10–50% and the final concentration of said multivalent metal ion is in the range of 20–50 mg/g low-methoxyl pectin.

6. A process in accordance with claim 5, wherein said organic acid is one or more members selected from the group consisting of citric acid, tartaric acid, malic acid, lactic acid and phosphoric acid.

7. A process in accordance with claim 5, wherein a member selected from the group consisting of sucrose, maltose, corn syrup, maltitol, α-glycosyl stevioside and mixtures thereof is used in combination with said glycosylsucrose.

8. A process in accordance with claim 5, wherein said multivalent metal ion is one or more members selected from the group consisting of $Ca^{2+}$ and $Mg^{2+}$.

9. A glycosylsucrose-containing pectin jelly prepared by the process of claim 5.

* * * * *